(12) United States Patent
Saren et al.

(10) Patent No.: US 10,470,968 B2
(45) Date of Patent: Nov. 12, 2019

(54) MASSAGE DEVICE FOR A VEHICLE SEAT

(71) Applicant: Kongsberg Automotive AB, Mullsjö (SE)

(72) Inventors: Jari Saren, Norrahammar (SE); Daniel Josefson, Mullsjö (SE)

(73) Assignee: Kongsberg Automotive AB, Mullsjö (SE)

( * ) Notice: Subject to any disclaimer, the term of this patent is extended or adjusted under 35 U.S.C. 154(b) by 680 days.

(21) Appl. No.: 14/991,203

(22) Filed: Jan. 8, 2016

(65) Prior Publication Data

US 2016/0200228 A1  Jul. 14, 2016

(30) Foreign Application Priority Data

Jan. 8, 2015 (DE) .................. 10 2015 100 141

(51) Int. Cl.
*A61H 9/00* (2006.01)
*B60N 2/90* (2018.01)

(52) U.S. Cl.
CPC ........... *A61H 9/0078* (2013.01); *B60N 2/976* (2018.02); *A61H 2201/1633* (2013.01); *A61H 2201/5002* (2013.01); *A61H 2201/5007* (2013.01); *A61H 2201/5051* (2013.01)

(58) Field of Classification Search
CPC ................. B60N 2/976; A61H 9/0078; A61H 2201/5007; A61H 2201/5002; A61H 2201/1633; A61H 2201/5051; A61H 9/00; A61H 9/0007; A61H 9/005; A61H 2201/0103; A61H 2201/0149; A61H 2201/12; A61H 2201/1207; A61H 2201/1238; A61H 2201/1623; A61H 2201/5035; A61H 2201/5038; A61H 2203/0431; A61H 2205/081
See application file for complete search history.

(56) References Cited

U.S. PATENT DOCUMENTS

| | | | |
|---|---|---|---|
| 4,338,923 A * | 7/1982 | Gelfer | A61H 9/0078 128/DIG. 20 |
| 5,135,282 A | 8/1992 | Pappers | |
| 6,916,300 B2 * | 7/2005 | Hester | A61H 23/04 297/284.6 |
| 2005/0228321 A1* | 10/2005 | Liao | A61H 9/0078 601/149 |
| 2006/0217645 A1* | 9/2006 | Lockamy | A61G 15/10 601/148 |

(Continued)

*Primary Examiner* — Quang D Thanh
(74) *Attorney, Agent, or Firm* — Howard & Howard Attorneys PLLC

(57) ABSTRACT

The present invention relates to a massage device for a vehicle seat including: a linear sequence of inflatable massage cells which may be arranged in succession below a of the vehicle seat, supply lines and venting lines to and from the massage cells, a compressed air pump connected to the supply lines, a valve arrangement for the selective supply of massage cells with compressed air and for the selective venting of massage cells and a control unit controlling the compressed air pump and the valve arrangement, and that the massage cells are designed such that in the inflated state they are wedge-shaped in cross section in a plane parallel to the longitudinal direction of the linear sequence of the massage cells, wherein the wedge shape of all of the massage cells in the linear sequence is oriented in the same direction.

9 Claims, 4 Drawing Sheets

(56) References Cited

U.S. PATENT DOCUMENTS

Figure 1:
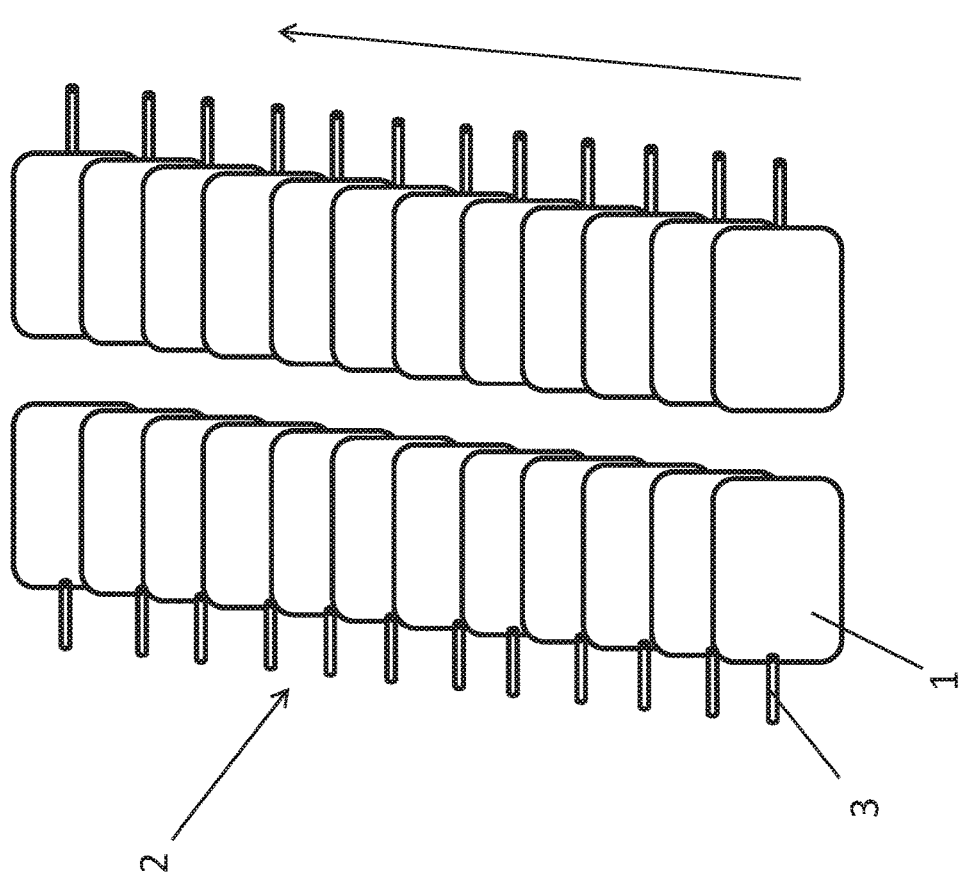

| | | | | |
|---|---|---|---|---|
| 2008/0080793 A1* | 4/2008 | Kitou | A61H 9/0078 | |
| | | | 383/3 | |
| 2012/0143108 A1* | 6/2012 | Bocsanyi | F15B 13/081 | |
| | | | 601/148 | |
| 2014/0207333 A1 | 7/2014 | Vandivier et al. | | |
| 2015/0126916 A1* | 5/2015 | Hall | A61H 9/0078 | |
| | | | 601/149 | |
| 2016/0296413 A1* | 10/2016 | Norman | A61H 9/0078 | |
| 2017/0224577 A1* | 8/2017 | Cartier | A61H 9/0078 | |

* cited by examiner

US 10,470,968 B2

MASSAGE DEVICE FOR A VEHICLE SEAT

RELATED APPLICATIONS

This application claims priority to and all benefits of German Patent Application No. 10 2015 100 141.1, filed on Jan. 8, 2015 with the German Patent and Trademark Office of the Federal Republic of Germany, the content of which is incorporated herein by reference.

The present invention relates to a massage device for a vehicle seat comprising: a linear sequence of inflatable massage cells which may be arranged in succession below a cover of a backrest or a seat body of the vehicle seat, supply lines and venting lines to and from the massage cells, a compressed air pump connected to the supply lines, a valve arrangement for the selective supply of massage cells with compressed air and for the selective venting of massage cells and a control unit controlling the compressed air pump and the valve arrangement, said control unit being designed for carrying out massage functions by controlling the compressed air pump and the valve arrangement according to predetermined programs or programs set individually by the user for the selective inflation and venting of massage cells in the linear sequence.

Such a massage device for a backrest of a vehicle seat is disclosed, for example, in U.S. Pat. No. 5,135,282 A. A linear sequence of inflatable massage cells is arranged in the vicinity of the inner surface of the cover of the backrest of the vehicle seat. A plurality of linear sequences of massage cells may also be arranged in parallel and adjacent to one another in the backrest, said massage cells then being simultaneously operated in order to carry out a sequential inflation and venting of the massage cells along the linear sequences of massage cells. Such a sequential inflation and venting of the massage cells along the linear sequences causes a deformation in the backrest which propagates in a wave-like manner. To this end, the massage device has a supply line structure with a common supply line which connects together the successive massage cells in series. Moreover, a venting line which accordingly connects together the sequence of successive massage cells in series is provided. The venting line may be open relative to the surrounding atmosphere in order to vent the massage cells. In order to produce inflation along the linear sequence of massage cells propagating in a wave-like manner, and accordingly to cause venting progressing in a wave-like manner along the linear sequence of massage cells, or in order to cause the expansion of individual massage cells, a valve arrangement with a plurality of controllable valves and a control unit for said valves is present. In particular, a controllable valve is present at the start of the supply line in front of the first cell, and a controllable valve is subsequently present between each pair of successive massage cells. The venting line is accordingly provided with controllable valves. In order to start an inflation cycle, initially the valve in front of the first cell in the linear sequence is opened and as a result the first massage cell is supplied with compressed air from a compressed air pump via the supply line. After inflation of the first massage cell, the control unit opens the valve to the second massage cell etc. until all massage cells are inflated. Subsequently, a sequential venting of the massage cells begins in reverse sequence.

Moreover, further structures of supply lines and valve arrangements are known, said structures permitting every massage cell in the linear sequence of massage cells to be selectively inflated or vented independently of all of the other massage cells, i.e. the sequence of massage cells is not arranged "in series" but a supply line controlled by a controllable valve is provided for each individual massage cell. Such a structure of supply lines and venting lines with associated valves makes it possible to cause a deformation propagating in a wave-like manner, by inflating along the linear sequence of the massage cells, wherein the wavelength of the sequence propagating in a wave-like manner may be considerably shorter than the length of the linear sequence, i.e. in each case only one or very few massage cells inflated to a maximum extent are present, whilst the next massage cell is already in the state of inflating and the previous massage cell is already vented. The isolated inflation/venting of individual massage cells is also possible.

In addition, structures of supply lines and venting lines and valve arrangements which require less than one valve per massage cell are also known. The present invention is also able to be used for such linear sequences of massage cells, as long as said massage cells are able to be operated in order to implement a sequential or selective inflation/venting along the linear sequence of massage cells.

In the massage device disclosed in U.S. Pat. No. 5,135,282 A, the massage cells are spaced apart from one another along the linear sequence of massage cells, i.e. a free space remains between each pair of adjacent massage cells.

Vehicle seats have an actual seat body and a backrest. Said seat body and backrest have a moulded foam base body made up of a support frame and a base body made of upholstery material enclosing this support frame. Externally, the moulded foam base body is enclosed by a seat cover made of fabric or leather. In the seat region (wherein in the present context said seat region also comprises the surface region of the backrest which comes into contact with the back of a person sitting on the motor vehicle) between the moulded foam base body and the seat cover, a foam layer is located as seat cover padding which is intended to improve the seating comfort and is also denoted as the comfort zone.

A massage device which has in the lumbar region three partially overlapping massage cells which are located below the seat cover padding is disclosed in US 2014/0207333 A1. Due to the position below the seat cover padding, however, the massage effect which is achievable thereby is very limited.

It is the object of the present invention to improve a massage device such that the effect associated with the wave-like propagation of the expansion of massage cells of a perceived wave-like movement in the propagation direction is intensified or, with the isolated expansion of individual massage cells, in addition to the expansion perpendicular to the seat body surface or backrest surface, a pushing movement is also effected transversely to the seat surface.

According to the invention it is provided that the massage cells are arranged directly below the seat cover and that the successive massage cells in the linear sequence are arranged so as to overlap one another in the longitudinal direction thereof, so that in each pair of successive cells the following cell and the previous cell partially cover each other. Moreover, the massage cells are designed such that in the inflated state they are wedge-shaped, viewed in cross section, in a plane parallel to the longitudinal direction of the linear sequence of the massage cells, i.e. in the inflated state the massage cells are in each case higher on one side than on the opposing side in the longitudinal direction. In this case, the wedge shape of all of the massage cells in the linear sequence is oriented in the same direction, i.e. the higher sides of the massage cells in the inflated state all face in one direction and accordingly the lower sides of the wedge shape of the massage cells in the inflated state also face in a direction which opposes the first-mentioned direction. The term "wedge-shape" here is not intended to be understood in the strict sense as a triangular shape with an acute angle but as a shape which is higher on one side than on the other side in the longitudinal direction of the linear sequence.

Due to the wedge-shaped design of the massage cells in the longitudinal direction of the linear sequence of the massage cells, upon inflation also a movement component which is oriented in the longitudinal direction of the linear sequence and thus is oriented in the propagation direction of a wave-like inflation of the massage cells is produced by each massage cell. As the massage cells are inflated from a vented flat shape to a wedge-shaped form, the shape rises more sharply on one side in the longitudinal direction during inflation, which leads to a movement component of the side rising more sharply which rotates around the side rising less sharply.

In the transition from the flat shape in the vented state to the wedge shape in the inflated state, a movement component which is oriented in the longitudinal direction of the linear sequence of massage cells is produced, said movement component assisting the propagating movement during inflation of the massage cells, which takes place in the longitudinal direction in a wave-like manner and sequentially over the linear sequence of the massage cells, and thus leads to a movement oriented in the longitudinal direction transversely to the body surface of a person seated on the vehicle seat. Also, with the isolated inflation of individual massage cells which are not adjacent, the expansion movement which takes place perpendicular to the seat surface is superimposed by a movement running transversely thereto which leads to a pulling or pushing massage movement acting transversely to the body surface.

It turned out that the combination of the measures to arrange the massage cells directly below the seat cover, to arrange them overlapping in the longitudinal direction and to design them such that they adopt a wedge shape when inflated, leads to the improved massage effect due to a bulging movement, with a force on the massaged body region acting transversely to the body part bearing against the seat cover.

In a preferred embodiment, the massage cells in the linear sequence have the same dimension in the longitudinal direction thereof, wherein the degree of overlap of successive massage cells is 10%-70% of the longitudinal dimension of the massage cells.

In a preferred embodiment, the side of the wedge shape of the massage cells which is higher in the inflated state, is at least double the height of the opposing lower side in the longitudinal direction.

In a preferred embodiment, the massage cells are designed in the manner of a folding bellows, wherein the outer folds are connected together on one side so that, after inflation of the folding bellows-like massage cell, the connected side forms the lower side of the wedge shape, as the connected outer folds on this side are not able to move away from one another and, therefore, on the connected side practically no expansion takes place during inflation.

By this folding bellows-type design of the massage cells, wherein the expansion of the folding bellows on one side is prevented by connecting the outer folds, a considerably asymmetrical inflation of the massage cells may be achieved in the longitudinal direction of the linear sequence or in other words an extreme wedge shape.

In a preferred embodiment, the massage cells may be formed in each case by two superimposed folding bellows elements. Alternatively, the massage cells may be formed in each case by three superimposed folding bellows elements.

Figure 3:
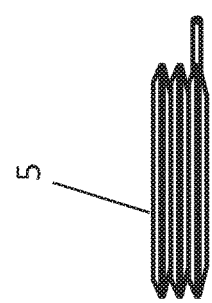
Figure 3:
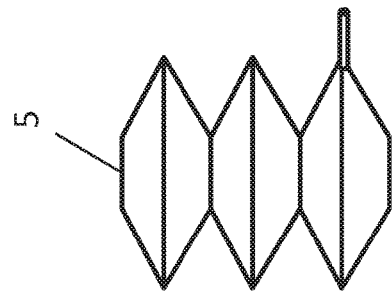
Figure 5:
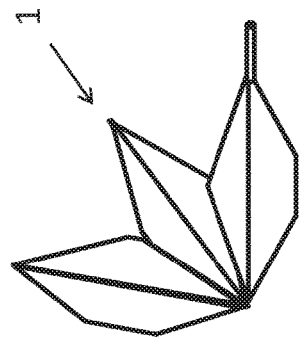
Figure 2:
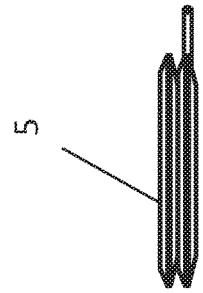
Figure 2:
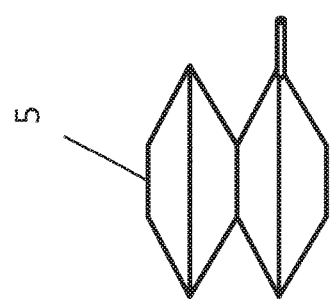
Figure 4:
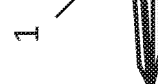
Figure 4:
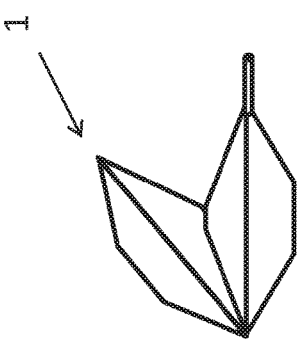
Figure 6:
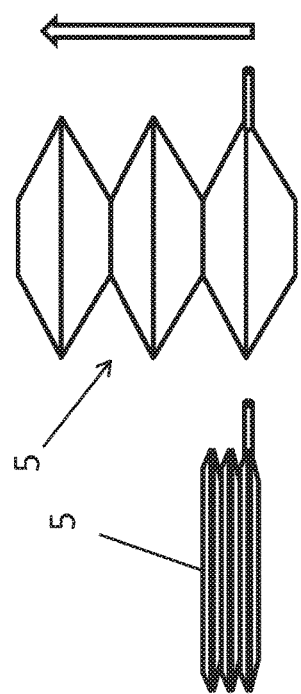
Figure 7:
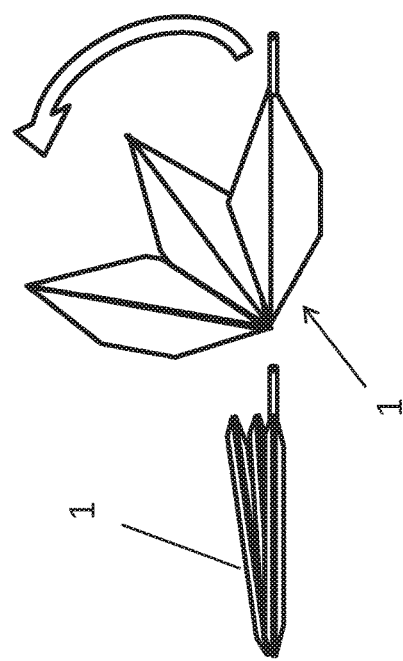
Figure 8:
Figure 9:
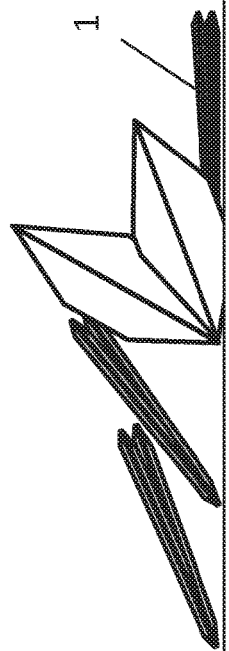
Figure 10:
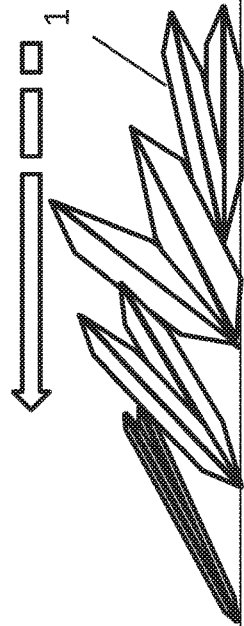

The invention is described hereinafter with reference to an exemplary embodiment in the drawings, in which:

FIG. 1 shows a schematic view of two parallel linear sequences of massage cells from above, FIGS. 2 and 3 show schematic side views of a conventional massage cell in the vented state and in the inflated state, FIGS. 4 and 5 show schematic side views of a massage cell in the vented state and in the inflated state, which massage cell may be used in a massage device according to the present invention, FIG. 6 shows schematic side views of a conventional massage cell in the vented state and in the inflated state, FIG. 7 shows schematic side views of a massage cell in the vented state and in the inflated state, which massage cell may be used in a massage device according to the present invention, FIGS. 8 to 10 show schematic side views of a linear sequence of massage cells according to the present invention, wherein in FIG. 8 all massage cells shown are vented, in FIG. 9 a massage cell is inflated and in FIG. 10 an aeration and venting takes place of successive massage cells propagating in a wave-like manner over the sequence.

A plurality of cells may be inflated simultaneously in order to produce a bulged portion propagating in a wave-like manner, in this case, depending on the cell size, up to six cells may be activated simultaneously, wherein they are in different stages of expansion. At the start of the venting of a cell the following two to three cells will be fully expanded or almost fully expanded. In addition to these bulging portions propagating in a wave-like manner, individual isolated massage cells or groups of adjacent massage cells may also be periodically inflated and vented.

FIG. 1 shows two parallel, adjacent linear sequences of massage cells 1 overlapping one another in the longitudinal direction of the linear sequence. Each massage cell 1 is shown schematically connected to a line 3, wherein this line 3 is connected to further supply lines and venting lines and a valve arrangement (not shown) so that each massage cell 1 is selectively aerated or vented independently of the others by the control of a control unit. For performing a massage function, the linear sequence 2 of massage cells and/or both linear sequences adjacent to one another are operated in parallel so that the aerated state and the vented state propagate in a wave-like manner in the longitudinal direction. For example, in each case the lowermost massage cell may be fully inflated in both adjacent massage cell sequences, the inflation of the subsequent massage cell being initiated thereafter and the venting of the first cell being started. This process may be continued in an uninterrupted manner so that the inflated portions of the massage cells propagating in a wave-like manner in the longitudinal direction of the linear sequence and correspondingly bulging portions propagating in a wave-like manner are produced on the surface of the backrest.

As an alternative to the wave-like bulging portions which run along the longitudinal direction, massage programs exist in which individual isolated massage cells or groups of adjacent massage cells are periodically inflated and vented.

In principle, it should be mentioned that the aeration line and the venting lines do not necessarily have to be lines which are physically different but individual lines may have a phased venting function and a phased aerating function, wherein the respective function is set by controlling the valve arrangement.

The massage cells are connected together in the linear sequence so that they are held at a predetermined distance overlapping one another as a linear group. The successive massage cells in the linear group may also be connected fully or partially by the aeration lines and venting lines.

In FIGS. 2 and 3 in each case a conventional massage cell is shown in the vented and inflated state. These massage cells 5 are designed in the manner of a folding bellows. In the massage cell 5 in FIG. 2 two folding bellows elements are superimposed, whilst in FIG. 3 three superimposed folding bellows form a massage cell. The interior of the massage cells 5 is continuous between the folding bellows elements. As FIGS. 2 and 3 show, the massage cell 5 expands from the vented state, shown in each case to the left, in the vertical direction to a multiple of the expansion in the vented state, by the massage cells 5 expanding in the manner of an accordion during inflation. In FIG. 6, which corresponds to FIG. 3, the purely vertical expansion of the folding bellows is indicated by the additional arrow.

According to one feature of the present invention, it is provided that in the inflated state the massage cells are wedge-shaped, i.e. in a section through a plane parallel to the longitudinal direction of the linear sequence of the massage elements and perpendicular to the plane of extension of the massage elements in the vented state, the massage cells have a greater expansion on one side than on the other opposing side in the longitudinal direction. A wedge-shaped configuration in this sense of the massage cells 1 may also be implemented by a folding bellows-type structure of the massage elements, as shown in FIGS. 4 and 5, wherein in each case a massage cell 1 is shown in the vented state and in the inflated state. In order to achieve the wedge-shaped configuration of the massage cells 1, adjacent folding bellows elements are connected together on one side at least in the region of the external folds, so that on the connected side an accordion-type folding cannot take place. In this manner, in FIGS. 4 and 5, a highly asymmetrical folding is implemented in the massage cells 1.

In FIG. 7 it is indicated by the curved arrow that the folding is associated with a rotating or pivoting movement component of the massage cell about the connected side of the massage cell. The asymmetrical wedge-shaped design of the massage cells 1, thus leads in addition to a vertical movement component, as is present exclusively in the conventional massage cells 5 from FIGS. 2, 3 and 6, to a transversely directed movement component which extends parallel to the surface of the backrest or the seat surface. These additional transversely extending movement components of the massage cells may be used in order to assist a movement in the propagation direction of a bulging portion propagating in a wave-shaped manner in the longitudinal direction over the sequence of massage cells. However, with periodic isolated bulging portions of individual massage cells or groups of adjacent massage cells at regular intervals, the massage cells configured in a wedge-shaped manner according to the invention produce a transversely extending movement component which effects a force component transversely to the surface of the body part bearing against the seat cover, for example from bottom to top along the back.

Shown schematically in FIGS. 8 to 10 are side views of a linear sequence of 4 successive massage cells 1, wherein in each case only the right-hand massage cell is provided with the reference numeral 1. In FIG. 8 all of the massage cells 1 are in the vented state, in FIG. 9 the second massage cell from the right is fully inflated. The inflation of individual isolated massage cells may also be used for implementing a massage function, wherein in this case the wedge-shaped configuration of the massage cells also leads to an asymmetrical folding which, in addition to the vertical bulging portion, leads to a movement transversely over the surface of the backrest and thus implements a specific massage effect.

A massage program which operates with an inflation of successive massage cells 1 propagating in a wave-like manner is illustrated schematically in FIG. 10. In the state shown, the cell located on the right-hand edge is already in the state of venting, the following cell is already inflated to a considerable degree whilst the third massage cell from the right is the first at the start of the inflation process. In such a sequential expansion of successive massage cells, which leads to a wave-like bulging portion propagating in the longitudinal direction of the sequence of massage cells, by the overlapping arrangement of the successive massage cells and the respective wedge-shaped configuration thereof which leads to an asymmetrical inflation, the movement of the bulging portion in the direction of propagation of the bulging portion propagating in a wave-shaped manner is further enhanced. As a result, a greater pushing movement component, acting parallel to the surface of the adjacent body part, is implemented by the bulging portion moving along the sequence of massage cells.

The invention claimed is:

1. A massage device for a vehicle seat having a seat cover, said massage device comprising:
   a linear sequence of inflatable massage cells arranged in succession and adapted to be disposed below the seat cover of the vehicle seat,
   supply lines and venting lines to and from the massage cells,
   a compressed air pump connected to the supply lines,
   a valve arrangement to selectively supply compressed air to the massage cells and to selectively vent the massage cells, and
   a control unit controlling the compressed air pump and the valve arrangement, wherein said control unit carries out massage functions by controlling the compressed air pump and the valve arrangement according to predetermined programs or programs set individually to selectively supply and vent the linear sequence of massage cells,
   wherein the massage cells are arranged in connected groups of adjacent massage cells with each group of adjacent massage cells being periodically inflated and vented as a unit,
   wherein the groups of adjacent massage cells are arranged in the linear sequence and are arranged so as to overlap with one another in a longitudinal direction such that, in each pair of first and second successive groups of adjacent massage cells, the first group of adjacent massage cells and the second group of adjacent massage cells are partially covering each other, and
   wherein the groups of adjacent massage cells are sequentially expanded for forming a wave effect below the seat cover of the vehicle seat, and during a portion of the wave effect an intermediate group of adjacent massage cells are inflated to a first degree to define an isolated bulging portion, a leading group of adjacent massage cells are simultaneously inflated to a second degree that is less than the first degree of the isolated bulging portion, and a trailing group of adjacent massage cells are simultaneously vented to a third degree that is less than the first degree of the isolated bulging portion.

2. The massage device according to claim 1, wherein each adjacent massage cell within each group of adjacent massage cells in the linear sequence has a longitudinal dimension in the longitudinal direction and an overlap between each adjacent massage cell within each group of adjacent massage cells is 10%-70% of the longitudinal dimension.

3. The massage device according to claim 1, wherein in an inflated state each group of adjacent massage cells has a wedge-shaped cross section in a plane parallel to the longitudinal direction, and each wedge-shape cross section of all of the group of adjacent massage cells in the linear sequence is oriented commonly in the longitudinal direction, and wherein in the inflated state a first side of the wedge-shaped cross section of each group of adjacent massage cells is at least double a height of an opposing lower side of the wedged-shaped cross section in the longitudinal direction.

4. The massage device according to claim 1, wherein each group of adjacent massage cells is designed as a folding bellows, wherein outer folds of the folding bellows are connected together on one side of the folding bellows so that, in an inflated state a connection of the outer folds form a lower side of a wedge-shaped cross section of the folding bellows.

5. The massage device according to claim 4, wherein each group of adjacent massage cells is formed by two superimposed folding bellows elements.

6. The massage device according to claim 4, wherein each group of adjacent massage cells is formed by three superimposed folding bellows elements.

7. The massage device according to claim 3, wherein each group of adjacent massage cells is designed as a folding bellows, wherein outer folds of the folding bellows are connected together on one side of the folding bellows so that, in an inflated state a connection of the outer folds forms a lower side of a wedge-shaped cross section of the folding bellows.

8. The massage device according to claim 1, wherein each group of adjacent massage cells is formed by two superimposed folding bellows elements.

9. The massage device according to claim 1, wherein each group of adjacent massage cells is formed by three superimposed folding bellows elements.

* * * * *